April 19, 1966    H. SONTHEIMER ETAL    3,246,762
APPARATUS FOR THE TREATMENT OF CONTAMINATED LIQUID
WASTES BY FLOCCULATION AND CLARIFICATION
Filed May 31, 1962
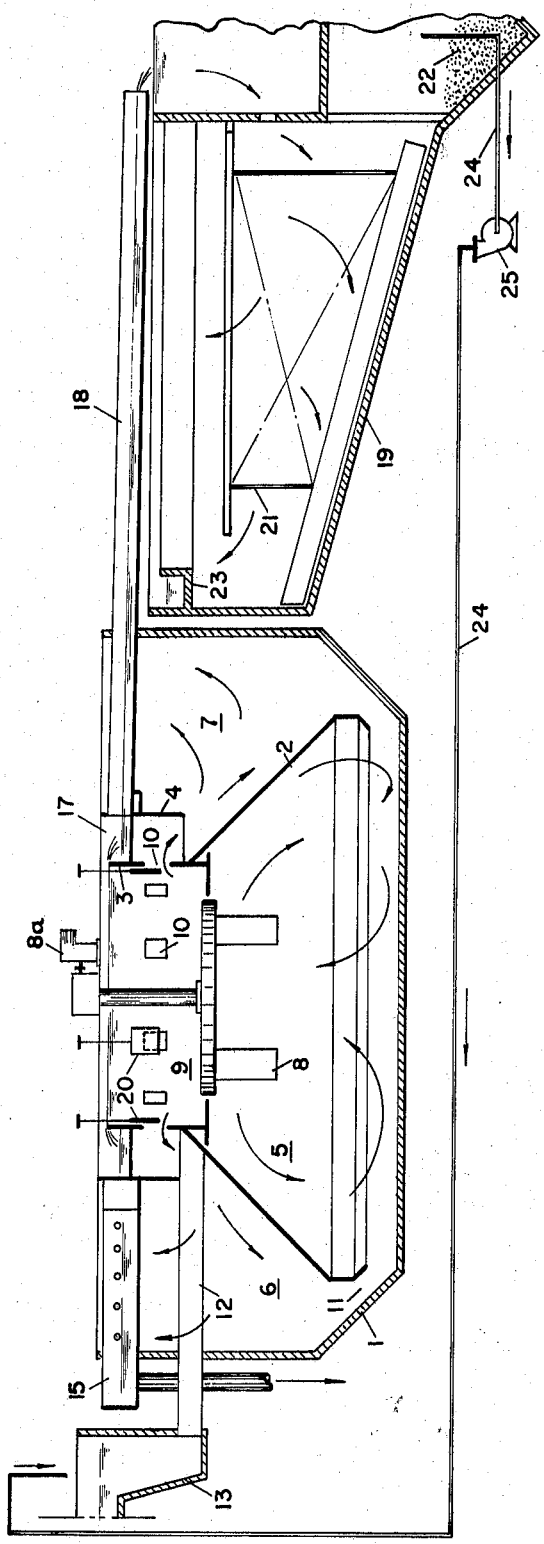

United States Patent Office 3,246,762
Patented Apr. 19, 1966

3,246,762
APPARATUS FOR THE TREATMENT OF CONTAMINATED LIQUID WASTES BY FLOCCULATION AND CLARIFICATION
Heinrich Sontheimer, 9 Auf dem Seif, Falkenstein, Taunus, Germany, and Günter Derenk, 2 Im Finkenschlag, Buchschlag, near Frankfurt am Main, Germany
Filed May 31, 1962, Ser. No. 198,968
4 Claims. (Cl. 210—195)

This invention relates to a process and apparatus for the treatment of contaminated liquid wastes and specifically for their treatment by flocculation and clarification.

It is an object of this invention to provide a highly efficient plant of the type referred to.

Another object is to combine and operate known apparatus for flocculation and clarification in such manner that the operating results of the composite plant are greatly improved over those obtainable from the components when operated individually in usual manner, and that quantities of liquid largely in excess of design capacity can be treated therein with such improved results.

Another object of the invention is to provide a composite plant of the type referred to wherein efficient flocculation can be effected without the use of flocculating agents.

Other objects of the invention will become apparent from the detailed description of the invention and the claims which follow.

Due to the increase in municipalities and industrial plants, the quantities of waste waters and the degree of their contamination are rising continuously in many regions.

Due to the increased quantities of waste waters discharged, a higher degree of clarification is required to protect the receiving stream from pollution than was necessary formerly. To conserve water, reuse of clarified waste waters is practiced frequently and this requires a particularly high degree of clarification.

The existing water and waste water treatment plants ordinarily cannot be adjusted to the increased requirements, because insufficient space for extensions was provided at the time when they were built, and because the treatment processes used in these plants cannot cope with the high degree of clarification required, particularly where reuse of the treated water is practiced.

Replacement of such an insufficient and out-of-date plant ordinarily is difficult because during the period of conversion even the low effectiveness of the parts of the plant to be torn down is lacking. In some urgent cases several superimposed installations have been built.

After some time of operation such and similar extensions are found to be too expensive, because they do not result in a substantial increase in the degree of clarification of the treated water.

In view of the quantities of liquid involved in waste water treatment, settling in sedimentation basins still is indispensable for the separation of solids from liquids.

It is known to accelerate the sedimentation in waste water clarification basins by adding flocculants. The mere addition of such chemicals to the inflow to the clarification basin does not effect an accelerated sedimentation of the solids which would permit a substantial increase in the throughput of the clarification basin, for the added chemicals are mixed only with the raw water. To form good flocs an effective relative movement between flocs and waste water is required. Such a movement is obtained by preceding the clarification basin with a flocculation basin, wherein, for example by means of a slowly rotating stirring mechanism, a relative motion between the flocs and the waste water is maintained.

Since the flocculation is improved and accelerated by a high solids concentration in the waste water, this solids concentration has been increased by returning sludge from the clarification basin to the flocculation basin. Numerous processes for the clarification of waters in the presence of solids previously collected in the process have been known for a long time. However, only in more recent times it was recognized that such solids formed in the process are fully effective only if they have not undergone sedimentation, which usually results in a deterioration.

The water treatment processes according to the slurry circulation system utilize this knowledge by circulating a concentrated slurry of solids contained in the raw water and/or flocs formed therefrom by means of flocculants, through a reaction zone and a separtion and clarification zone. The raw water is added to this circulation in the reaction zone, clarified water is displaced in the separation zone upwardly into the clarification zone, and excess solids are withdrawn from the circulation in the separation zone by means of sludge pockets or a sludge withdrawal line. In these plants flocculation and clarification are carried out simultaneously.

It has been found that the throughput of such a plant which operates according to the slurry circulation system can be increased to an unusual degree, by subjecting only a portion of the incoming raw water to flocculation and clarification in the slurry circulation system, and the balance only to flocculation therein, while effecting its clarification in a subsequent clarification basin.

It has also been found that with certain wastes the slurry circulation alone improves the conditions for flocculation sufficiently that good flocculation is obtained with a relatively short holding time and dosing with flocculants is unnecessary. With other wastes flocculants are required to obtain the full benefits of the large increase in throughput made possible by the invention.

The process according to the invention serves for the treatment of contaminated waters, particularly waste waters, by flocculation and clarification according to the slurry circulation process and is characterized by the withdrawal of a regulable part of unclarified liquid from the slurry circulation and its clarification by sedimentation in a clarification basin.

In addition to the water, which is displaced from the slurry circulation into the clarification zone of the slurry circulating system and withdrawn therefrom in clarified condition, a further part of the floc containing water is withdrawn from the slurry circulation and passed to a sedimentation basin in unclarified condition. The throughput of raw waste water through the slurry circulation system is increased by the portion passed to the sedimentation basin.

The raw water introduced into the plant operated according to the slurry circulation process leaves the plant in two streams, one of which is clarified water, while the other is flocculated but unclarified waste water which is passed to a clarification basin.

Preferably the unclarified floc containing partial stream is withdrawn from the slurry circulation at a point between the reaction zone and the separation zone. This permits to regulate the solids concentration in the circulating slurry.

A plant according to the invention comprises a basin of known construction for carrying out the slurry circulation process, with a reaction zone, a superposed distribution zone with adjustable ports leading to a clarification and separation zone, and a sedimentation basin of known construction which follows the slurry circulation basin and, according to the invention, is connected with the distribution zone of the slurry circulation basin by an effluent channel or flume.

The sedimentation basin following the slurry circulation basin advantageously is provided with a thickening zone whence concentrated but not yet deposited sludge can be returned to the reaction zone of the first stage.

The invention is particularly useful where the throughput as well as the degree of clarification of an existing sedimentation plant are to be increased without increasing the area correspondingly.

The invention will be explained in detail in connection with the drawing which shows diagrammatically a partial vertical section of a plant according to the invention.

The round basin 1 is divided by concentric partitions 2, 3 and 4 into a reaction zone 5, a separation zone 6 and a clarification zone 7. A slowly moving rotor 8, driven by a motor-reducer 8a, circulates the liquid contained in the basin from the reaction zone 5 to a superposed distribution zone 9, and through ports 10, the separation zone 6 and port 11 back to reaction zone 5. Into this circulation raw water is introduced through an inlet conduit 12 which leads, as shown, from an inlet flume 13, into reaction zone 5, which is surrounded by partition 2. If chemicals are used for flocculation, they may be added to the waste on its way to the basin 1 or be introduced into the reaction zone through a chemical line, not shown. In the separation zone 6 treated water separates and passes upwardly into the clarification zone 7 and is withdrawn through radial launders 15 to a point of disposal or storage. The upper edge of partition 3, which surrounds the distribution zone 9, is formed as an overflow weir to a surrounding launder 17. From this launder 17 a channel 18 leads to a clarification basin 19. The ports 10 in partition 3 form a passageway from the distribution zone 9 to the separation zone 6. This passageway can also be formed by a continuous slot. The passageway can be throttled by means of a valve or valves 20. When the ports 10 are throttled a greater proportion of the circulating slurry of flocculated unclarified waste flows over the edge of partition 3 into the launder 17 and through channel 18 into the clarification basin 19. Thus the proportion of the two streams, that being clarified in separation zone 6, and that being clarified in sedimentation basin 19, is varied.

The clarification basin 19 is conventional in construction, sizing and operation. For purposes of illustration it is indicated as round, but it could be of any other suitable shape. The basin 19 is provided with sludge scrapers 21, which move the settled sludge to a centrally located sump 22. Clarified water may be withdrawn through a launder 23.

The throttling valve 20 may be in the form of a vertically adjustable sleeve fitting into the partition 3 and covering all ports 10 uniformly, or, as shown, ports 10 can be provided with independently adjustable gate valves. The sleeve, or gates may be adjusted in known manner by means of handwheels or the like, to cover any desired portion of the ports 10. By changing the flow cross section of the ports 10, the relationship between the two partial streams which pass from the distribution zone 9 to the separation zone 6 and to the sedimentation basin 19, respectively, can be adjusted. Obviously, where the conditions do not vary, and the proportions of the flocculated waste withdrawn to the separation zone 6 and the sedimentation basin 19, respectively, are fixed, the ports 10 can be made of proper flow cross section to pass the desired quantity, and the throttling valves 20 can be omitted.

The plant preferably is operated so that the quantity of liquid passing from the distribution zone 9 to the sedimentation basin 19 is two or three times as much as the stream passing to the separation zone 6. The raw water throughput thus can be three to four times the design capacity of the plant for slurry circulation.

The flocculation zone 5 preferably is made relatively large, to provide for the necessary holding time therein despite the fact that the throughput largely exceeds the design capacity of the slurry circulation basin 1. It has been found, however, that in the composite plant according to this invention good flocculation is obtained in most cases with a shorter holding time in the flocculation zone than is required when treating wastes in the slurry circulation basin in the usual manner, i.e., with clarification of the entire wastes in the basin.

The rotor 8 must have a sufficient pumping capacity to circulate more than the entire quantity of waste passing through the slurry circulation basin 1.

When operating in this manner the liquid flowing from the separation zone to the sedimentation basin carries so many solids in form of flocs, that a special sludge removal from the slurry circulation plant usually becomes unnecessary. In some cases it is advantageous to provide a thickening zone in the sedimentation basin, from which a concentrated suspension of solids which have not fully settled can be returned to the reaction zone 5 of the slurry circulation plant, in order to maintain therein a higher solids concentration.

When it is desired to provide for the return of solids from the basin 19 to the reaction zone 5 of the basin 1, a conduit 24 may connect the two basins and a pump 25 be installed on the conduit. One end of conduit 24 extends into the basin 19 to an elevation where the solids settling out of the waste are concentrated but not deposited. The other end of conduit 24 discharges to the flume 13. The pump 25 may be operated continuously or intermittently, to maintain the slurry concentration in the reaction zone 5 at a desired value.

Example:

In a steel mill two round clarifiers, operating in parallel, were available for the clarification of 2000 m.$^3$. Since it was necessary to reuse the clarified water in the plant the required degree of clarity of the treated water was 36 mg. of solids per liter.

There was not sufficient space available for a slurry circulation plant for treating the additional incoming 2000 m.$^3$ of waste water. Nor would such a plant have been sufficient, because the clarification effected in the waste water treated in the clarifiers was not such that a mixture of the clarified water from the clarifiers and from a slurry circulation plant would have had the required low solids content.

By using the invention, the problem was solved.

In addition to the existing sedimentation basins, a slurry circulation plant was built and was provided, in accordance with the invention, with a distribution zone and outlet means leading therefrom to the sedimentation basin. This slurry circulation plant was designed for a throughput of 1000 m.$^3$/h.; however, its reaction zone was larger than in a conventional slurry circulation plant of 1000 m.$^3$/h. capacity. Into this slurry circulation plant the entire 4000 m.$^3$/h. of waste water to be treated were introduced. 3000 m.$^3$/h. were withdrawn from the distribution zone in unclarified condition and passed to and divided between the sedimentation basins. 1000 m.$^3$/h. clarified water with a solids content of 20 mg. per liter were withdrawn from the clarification zone of the slurry circulation plant. The 3000 m.$^3$/h. clarified water from the two sedimentation basins contained 33 mg. of solids per liter. The considerable improvement of the degree of clarification and simultaneous increase of the throughput, as compared with the previous method of operation with sole use of the sedimentation basins, results from the efficient and rapid flocculation in the slurry circulation plant.

The combined clarified water streams from the sedimentation basins and the slurry circulation plant had a solids content of only 30 mg. per liter.

Many modifications of the embodiment shown and described herein can be made without departing from the spirit and scope of the invention.

We claim:

1. A composite plant for flocculation and clarification of contaminated liquid wastes, comprising a flocculation and clarification basin and a sedimentation basin arranged in sequence, inlet means for waste to be treated to said flocculation and clarification basin, partition means in said flocculation and clarification basin forming therein a reaction zone and a superposed distribution zone in the space on one side of said partition means, and a separation zone and a superposed clarification zone in the space on the other side of said partition means, a passageway leading from said distribution zone through said partition to an upper portion of said separation zone, said passageway being of such flow cross section to pass only a portion of the flocculated unclarified waste in said distribution zone to said separation zone for separation of clarified liquid from the flocculated waste, a lower portion of said separation zone being in hydraulic communication with said reaction zone, means for circulating the waste contents of said reaction zone to effect flocculation of said waste and for maintaining a circulation of said portion of flocculated waste from said reaction zone, through said distribution zone and passageway to and through said separation zone and back to said reaction zone, clarified liquid withdrawal means from said clarification zone, the upper edge of said partition means forming an overflow for the balance of the flocculated unclarified waste in said distribution zone, conduit means receiving the flocculated unclarified waste passing over said overflow and introducing it into said sedimentation basin for clarification therein, said sedimentation basin having a sludge sump and means for withdrawing clarified liquid to a point of disposal.

2. The plant of claim 1 including means for adjusting the flow cross section of said passageway to vary the proportions of unclarified flocculated waste passing through said passageway and over said overflow, respectively.

3. The apparatus of claim 1, including means for transferring concentrated solids from an elevation in said sedimentation basin above the deposited sludge to said reaction zone.

4. The plant of claim 1, including a launder surrounding the upper portion of said partition means and receiving the flocculated unclarified waste passing over said overflow, said conduit means leading from said launder.

References Cited by the Examiner
UNITED STATES PATENTS

| | | | |
|---|---|---|---|
| 2,331,031 | 10/1943 | Kurtz | 210—4 X |
| 2,348,125 | 5/1944 | Green | 210—14 X |
| 2,429,315 | 10/1947 | Green | 210—208 |

OTHER REFERENCES

Infilco, the Accelator treating plant, Bulletin 1825–D, 1957, Infilco Inc., Tucson, Ariz., pp. 6, 7, 10 and 11 relied on; 27 pp.

MORRIS O. WOLK, *Primary Examiner.*